(12) United States Patent
Lee et al.

(10) Patent No.: US 8,274,739 B2
(45) Date of Patent: Sep. 25, 2012

(54) PLASMONIC FABRY-PEROT FILTER

(75) Inventors: Byounghee Lee, Wexford, PA (US); Byung Il Choi, Pittsburgh, PA (US)

(73) Assignee: NanoLambda, Inc., Pittsburgh, PA (US)

( * ) Notice: Subject to any disclaimer, the term of this patent is extended or adjusted under 35 U.S.C. 154(b) by 470 days.

(21) Appl. No.: 12/521,400

(22) PCT Filed: Dec. 21, 2007

(86) PCT No.: PCT/US2007/026071
§ 371 (c)(1),
(2), (4) Date: Jun. 26, 2009

(87) PCT Pub. No.: WO2008/085385
PCT Pub. Date: Jul. 17, 2008

(65) Prior Publication Data
US 2010/0053755 A1    Mar. 4, 2010

Related U.S. Application Data

(60) Provisional application No. 60/877,659, filed on Dec. 29, 2006.

(51) Int. Cl.
*G02B 1/10* (2006.01)
*G02B 5/28* (2006.01)
*G01B 9/02* (2006.01)
*G01J 3/45* (2006.01)

(52) U.S. Cl. ............... 359/585; 359/590; 356/454

(58) Field of Classification Search ........... 359/260, 359/577, 580, 589, 590, 585; 356/454, 469, 356/506; 372/92–107
See application file for complete search history.

(56) References Cited

U.S. PATENT DOCUMENTS

| | | | |
|---|---|---|---|
| 6,236,033 B1 | 5/2001 | Ebbesen et al. | |
| 6,891,322 B2 | 5/2005 | Lee et al. | |
| 6,992,826 B2 | 1/2006 | Wang | |
| 7,315,426 B2 | 1/2008 | Kim et al. | |
| 7,420,156 B2 | 9/2008 | Kim et al. | |
| 7,426,040 B2 | 9/2008 | Kim et al. | |
| 7,456,383 B2 | 11/2008 | Kim et al. | |
| 2002/0036828 A1* | 3/2002 | Wong | 359/585 |
| 2003/0206708 A1 | 11/2003 | Estes et al. | |
| 2005/0161589 A1 | 7/2005 | Kim et al. | |
| 2006/0209413 A1* | 9/2006 | Kim et al. | 359/577 |
| 2006/0273245 A1 | 12/2006 | Kim et al. | |
| 2009/0073434 A1 | 3/2009 | Kim et al. | |

FOREIGN PATENT DOCUMENTS

| | | |
|---|---|---|
| JP | 2004-070288 A | 3/2004 |
| KR | 10-2002-0065281 A | 8/2002 |
| KR | 10-2004-094580 A | 11/2004 |

OTHER PUBLICATIONS

U.S. Appl. No. 12/521,376, filed Dec. 21, 2007, Lee et al.
U.S. Appl. No. 12/521,416, filed Dec. 21, 2007, Lee et al.
International Search Report dated Mar. 14, 2008, in PCT/US2007/026135, 2 pages.
International Search Report dated Jun. 2, 2008, in PCT/US2007/026069, 2 pages.

* cited by examiner

*Primary Examiner* — Alessandro Amari
(74) *Attorney, Agent, or Firm* — The Marbury Law Group, PLLC

(57) ABSTRACT

A plasmonic Fabry-Perot filter includes a first partial mirror and a second partial mirror separated from the first partial mirror by a gap. At least one of the first partial mirror or the second partial mirror includes an integrated plasmonic optical filter array.

14 Claims, 11 Drawing Sheets

Figure 5A   Figure 5B
Figure 5C   Figure 5D
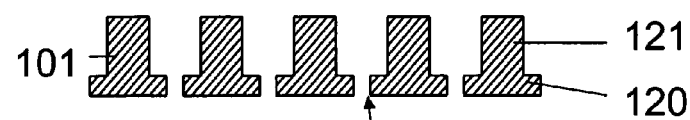
Figure 5E
Figure 5

PLASMONIC FABRY-PEROT FILTER

CROSS-REFERENCE TO RELATED PATENT APPLICATIONS

The present application is a National Stage of PCT/US2007/026071, filed Dec. 21 2007, which claims benefit of United States provisional application 60/877,659, filed Dec. 29, 2006, which are incorporated herein by reference in their entirety.

BACKGROUND OF THE INVENTION

Optical filtering is an important concept in optics, and is commonly involved in a variety of optical components and instruments. One example is to use optical filters for optical detectors. Optical detectors are normally sensitive to a broad spectrum of light so that light of broad range of lights all might be detected. Therefore it would be much more useful to have a material or a device that operates exactly in a reverse manner that it selectively transmits light only in a narrow range of frequencies within a broad spectrum.

A Fabry-Perot resonantor can be used to filter or demultiplex the light. Though the Fabry-Perot can extract a narrow band of wavelength, a transmission spectrum of Fabry-Perot cavity structure usually shows multiple peaks with narrow passband width. For most applications, this multiple peaks should be selected by using external bandpass filters.

SUMMARY OF THE INVENTION

Plasmonic optical filter devices can be made of metal film with array of apertures thereon, plural of metal islands or array of metal embossing.

A Fabry-Perot optical filter with an embedded (i.e., integrated) passband filter made of plasmonic metal filter array is presented. One of the mirrors or both mirrors in the Fabry-Perot filter are plasmonic devices made of metal film with array of apertures thereon, plural of metallic islands or array of metal embossing.

The plasmonic device array patterns are configured such that when light is incident on the array structures, at least one plasmon mode is resonant with the incident light to produce a transmission spectral window with desired spectral profile, bandwidth and beam shape. This transmission spectral window functions as an embedded passband filter for the Fabry-Perot filter.

Such plasmonic Fabry-Perot filter can be used as various wavelength filtering devices for chip scale spectrometer, color image sensor, hyperspectral image sensor, or color flat panel display and WDM.

BRIEF DESCRIPTION OF THE DRAWINGS

FIG. 5A through 5E show perspective views of different examples of plasmonic Fabry-Perot filter devices;

DETAILED DESCRIPTION OF THE PREFERRED EMBODIMENTS

Unless otherwise specified, the words "a" or "an" as used herein mean "one or more". The term "light" includes visible light as well as UV and IR radiation. The invention includes the following embodiments.

Figure 1:
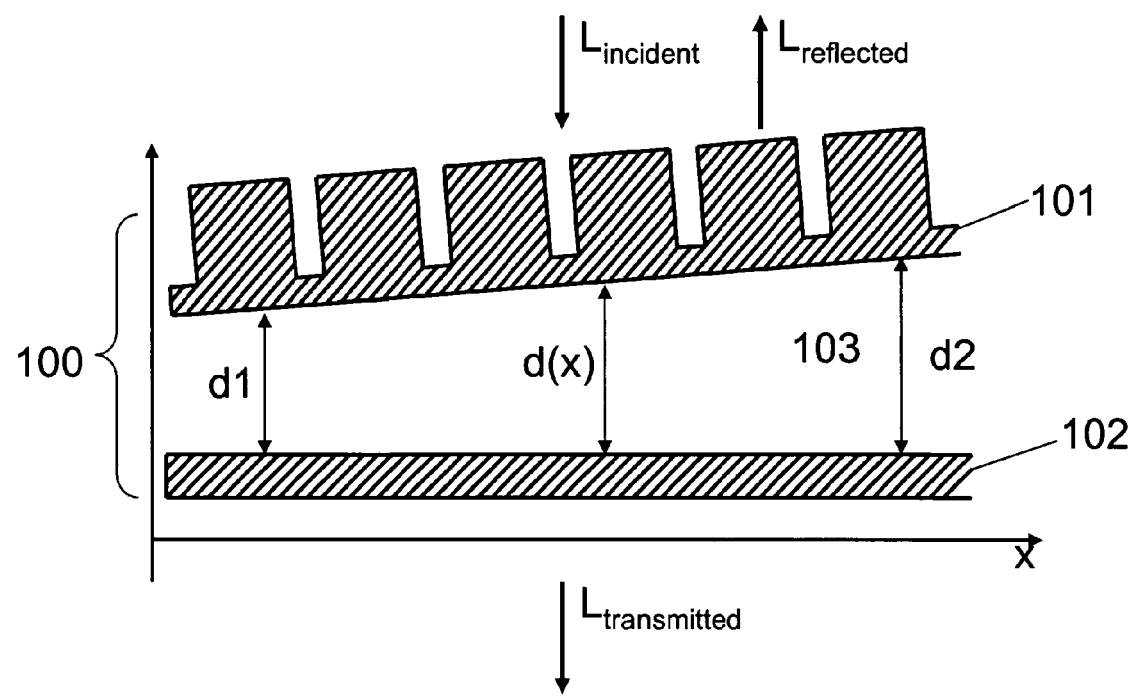
FIG. 1 is a graphical representation of a plasmonic Fabry-Perot filter.

FIG. 1 illustrates a significantly compact, plasmonic Fabry-Perot cavity filter system that can provide enhanced resolution of about $\lambda/50$ or less, such $\lambda/100$ or less (i.e., the resolution is the incident wavelength of light $\lambda$ divided by 100, for example about 10 nm resolution or band width for 1000 nm wavelength radiation). The system 100 comprises the following parts: a first partial mirror 101, a second partial mirror 102, and a gap 103 between the first partial mirror and the second partial mirror which is filled with vacuum, air or a solid dielectric material. The mirrors and the gap form a Fabry-Perot cavity etalon filter. The first and/or the second mirrors 101, 102 may be tilted with respect to an imaginary center line running through the middle of the gap in the filter width direction ("x") or the mirrors 101 and 102 may be fixed along the width of the filter. Thus, the height of the gap 103 either varies (such as increases) along the width of the filter or remains constant along the width of the filter, respectively. If the gap height varies, then it can vary in discrete steps or monotonically (i.e., continuously) along the width of the filter. Furthermore, at least one of or both of the first partial mirror 101 or the second partial mirror 102 also comprise a plasmonic optical filter array. Thus, one or both mirrors function as a plasmonic band pass filter and as a mirror of a F-P etalon filter.

Figure 7:
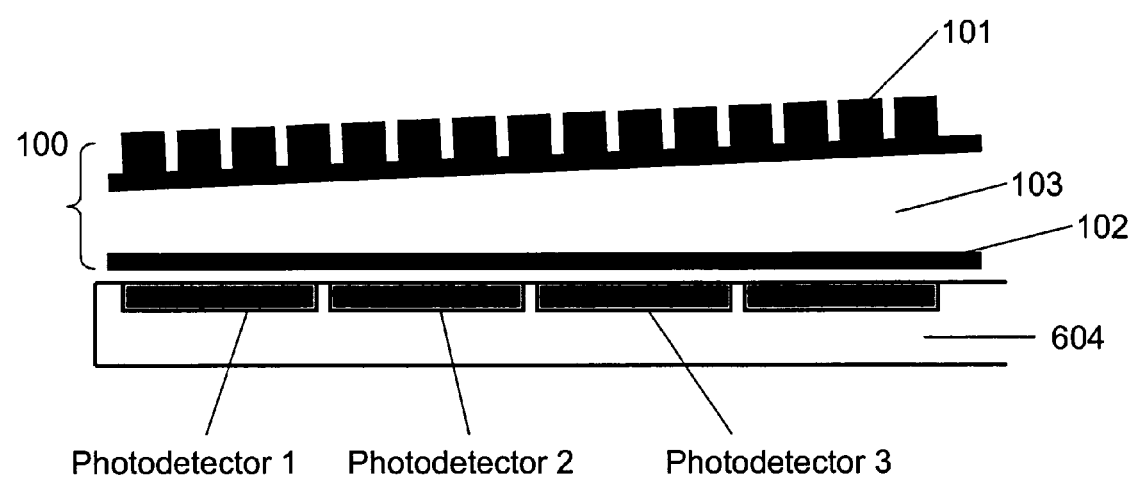
FIG. 7 is schematic representation of a chip scale spectrometer.

A transmission spectrum of a Fabry-Perot cavity structure usually shows multiple peaks with narrow passband width. The spacing between neighboring peaks is primarily determined by the gap between the two mirrors that form a cavity, and a dielectric function of the material sandwiched in the cavity. The spectral width of a Fabry-Perot resonance peak is mainly determined by the reflectivity of the two mirrors, and can be designed to be less than $\lambda/100$. In the configuration of FIG. 1, the mirror spacing "d" (i.e., height of the gap between the mirrors) is variable along the filter width ("x"). Preferably, the mirror spacing of the Fabry-Perot cavity filter varies monotonically or as a step function along the array direction. Thus, as shown in FIG. 7, different photodetectors 1, 2, and 3 of a photodetector array 604 are located in locations which correspond to a different cavity 103 height ("d" in FIG. 1).

Thus, each photodetector of the array 604 is adapted to detect a different peak wavelength transmitted through the integrated Fabry-Perot filter 100.

Figure 3:
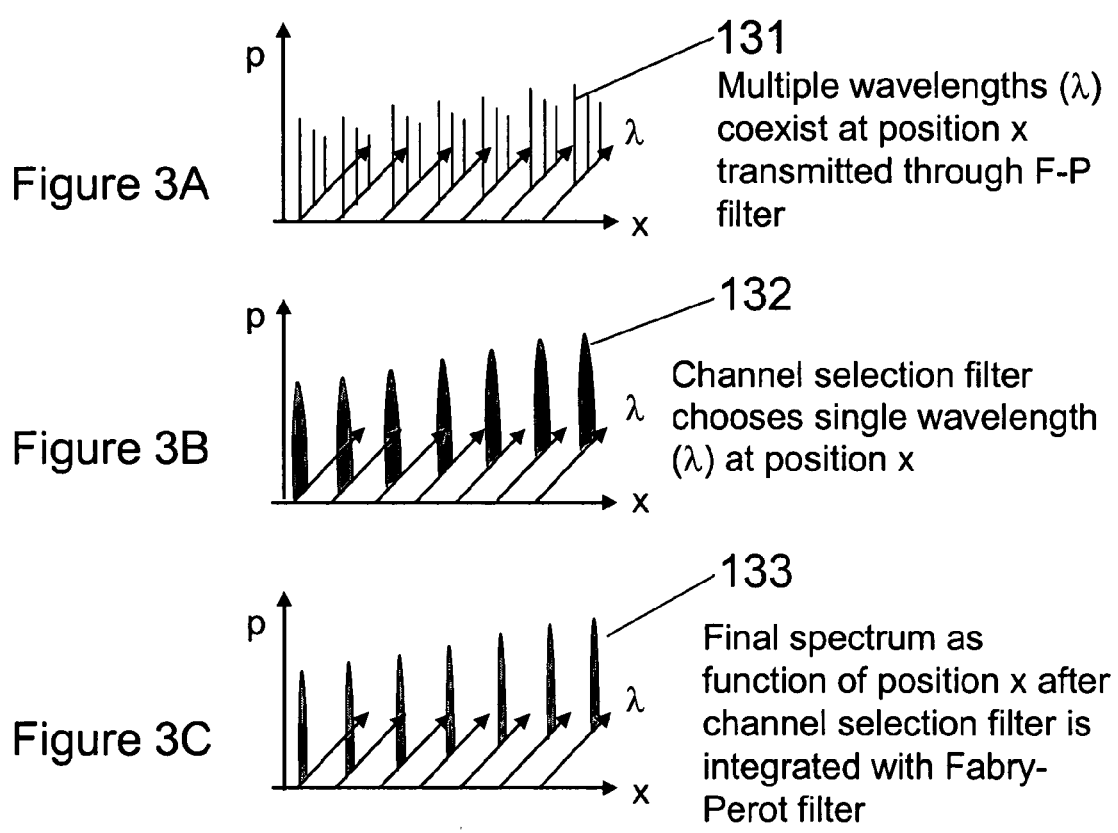
FIG. 3A is a graphical representation of multiple wavelengths coexisting at a position x.
FIG. 3B is a graphical representation of channel selection at a position x by plasmonic passband filter.
FIG. 3C is a graphical representation of the selected single wavelength at position x by the integration of embedded plasmonic Fabry-Perot filter.

FIG. 3A shows a plot of radiation transmitted through a F-P cavity etalon filter. In FIG. 3A, multiple solid lines 131 on wavelength direction represent multiple narrow wavelength peaks or bands coexisting at a position x because of Fabry-Perot resonance effect in the plasmonic Fabry-Perot device 100. FIG. 3B shows a plot of radiation transmitted through a plasmonic metal filter array (i.e., passband or channel selection filter). FIG. 3B shows the wider transmitted wavelength band 132 characteristic of the channel selection filter/plasmonic pass band filter 101 at a position x. These channel selection filters pass only one peak out of multiple peaks of the Fabry-Perot resonance. FIG. 3C shows the final spectrum of radiation transmitted through a combination of a F-P cavity etalon filter with an integrated plasmonic metal channel selection (passband) filter. Only the selected single wavelength peak or band 133 is transmitted through at position x by the integration of embedded plasmonic channel selection filter into one or both mirrors of the Fabry-Perot cavity filter. In other words, only one of the plurality of F-P peaks or bands coexisting at position x is transmitted to a detector by the passband filter.

The Fabry-Perot transmission peaks continuously shift to a certain direction as a function of location along the array (and thus of gap between mirrors). Depending on the spectral range of interest, only one Fabry-Perot peak in a relatively narrow wavelength span may be observed. However, in the case of relatively wide span, multiple Fabry-Perot peaks usually appear. Thus, the channel selection plasmonic filter array 101 is embedded to select only one peak transmitted through the Fabry-Perot cavity filter 100 and to filter out all other peaks. In order to achieve narrow bandpass filtering, whose center wavelength is designed to vary along the array direction, an array of relatively wide bandpass filters is used. The plasmonic mirror 101 and mirror 102 are optically coupled to each other such that an incident radiation beam passes through both mirrors before reaching the detector 604, as shown in FIG. 7, or reaching an observer.

Figure 2:
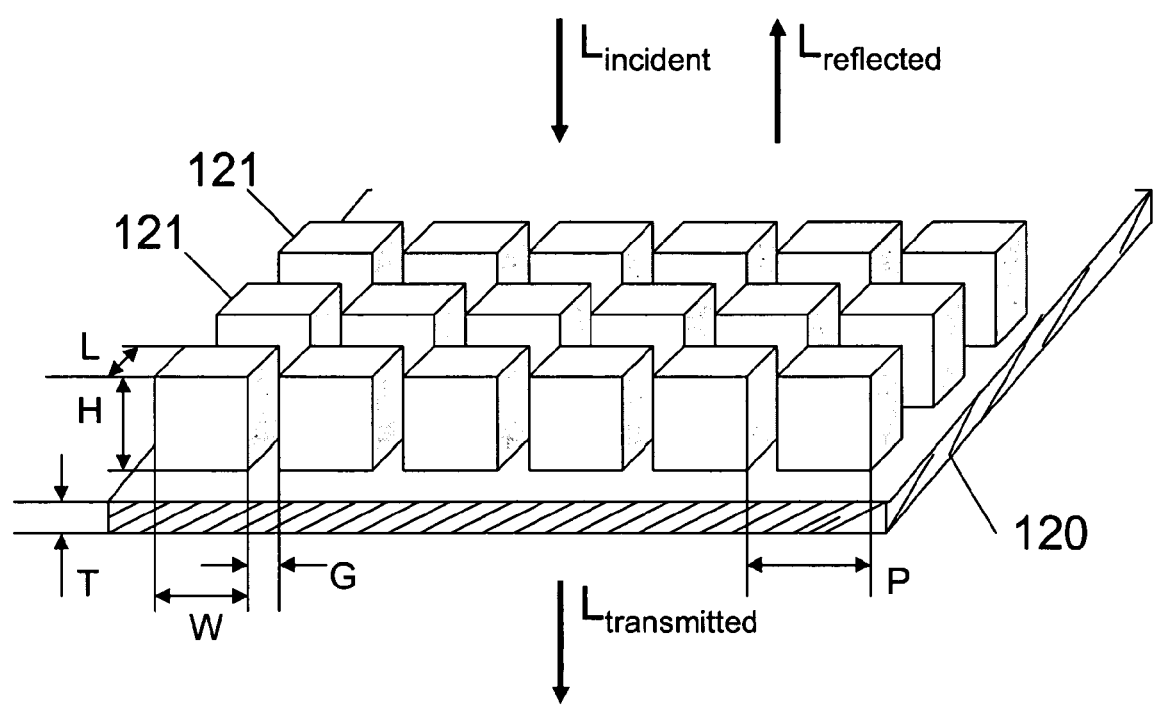
FIG. 2 is a perspective view of an embossing array on a metallic film.

In FIG. 2, the plasmonic metallic filter array (i.e., the band pass or channel selection filter which is integrated into a mirror 101) comprises a thin metal film 120 containing an array of embossing structures 121, such as metal structures 121, in a square pattern, (shown not to scale). The metal may be any metal and is preferably Ag, Au, Cr or Al or alloys thereof. The gap between embossing structures is G. The width, length and height of the embossing structures are W,L and H respectively. The thickness of metallic film or plate 120 is preferably in the range of approximately 1 to 50 nm which renders the gaps at least partially optically clear (i.e., the gap at least partially transmits the incident light). The intensity of the incident light is $L_{incident}$ and the intensity of the transmitted light after traveling through the gaps in the embossing structures and film is $L_{transmitted}$. In FIG. 2, an unsupported thin metal plate is shown, however, a thin metal film deposited on an optically transparent substrate, such as a glass, quartz or polymer, is also contemplated by the present invention. Thus, the metal film 120 is continuous and does not need to contain any apertures or holes which extend through the entire film in the gap region. Thus, the film 120 is preferably continuous and contains no through apertures or holes in the gap or the feature 121 regions. In contrast, prior art plasmonic resonance structures contain through holes which extend through the entire metal film. However, in an alternative configuration, through holes or apertures may be formed in the film 120 in the gap regions between the features 121.

The embossing structures 121 may be formed by any suitable method. For example, the structures 121 may be formed by embossing grooves into the film to form the gaps G. Alternatively, the structures may be formed by photolithographic etching of the gaps G in the film. Alternatively, the structures 121 may be formed by direct deposition of the structures 121 on the metal film 120 or by forming a metal layer on the film 120 and patterning the layer into the structures 121. Alternatively, the structures 101 may be formed by electroplating or electroless plating. Alternatively, the structures 101 may be formed by combination of aforementioned methods. The film 120 forms one of the partial mirrors 101, 102 of the F-P etalon filter 100 which contacts the dielectric material in gap 103.

Figure 4A:
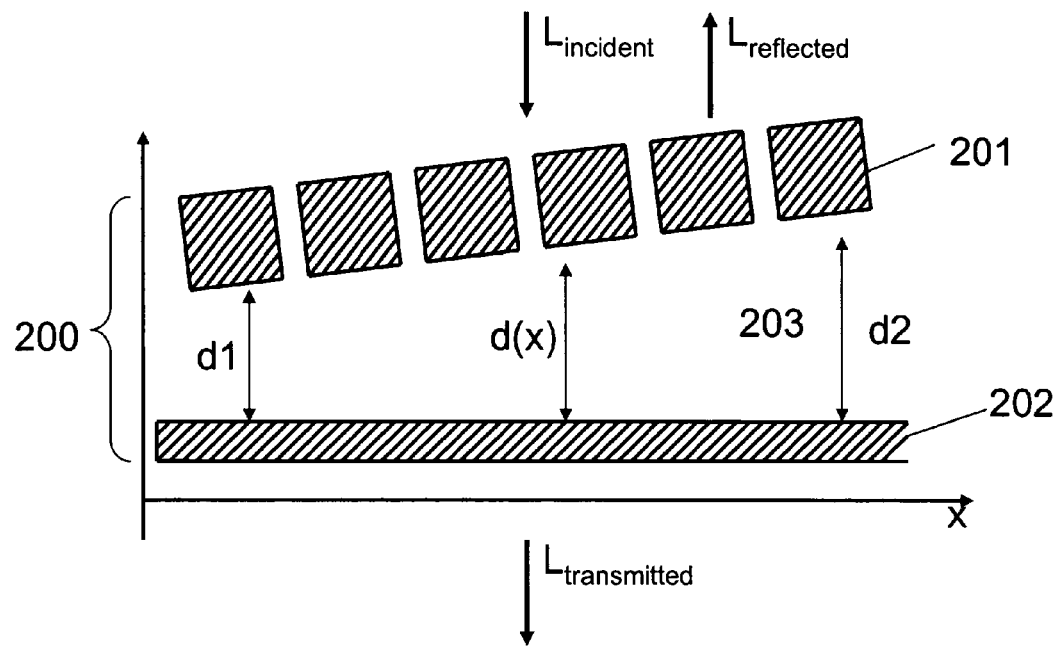
FIG. 4A is a graphical representation of another plasmonic Fabry-Perot filter comprising of array of apertures on a metal film or array of metal islands.
Figure 4B:
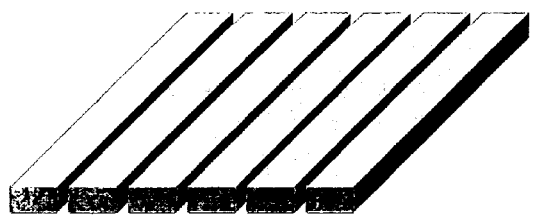
FIG. 4B is a perspective view of plural of metal islands.
Figure 4C:
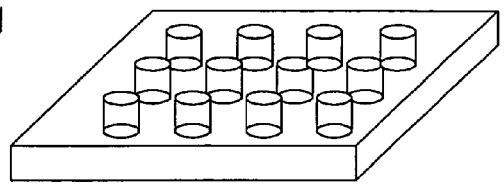
FIG. 4C is a perspective view of aperture array on a metal film.

Alternatively, as shown in FIG. 4A, the embedded bandpass or channel selection filter may comprise metal film with array of apertures therein or a plurality of metal islands separated by subwavelength spacing as disclosed in U.S. applications Ser. No. 10/566,946 (now U.S. Pat. No. 7,456,383) and Ser. No. 11/345,673 (now U.S. Pat. No. 7,420,156) filed on Jul. 22, 2004 and Feb. 2, 2006, respectively, both of which are incorporated herein by reference in their entirety. FIG. 4B illustrates the embodiment where the bandpass filter/partial mirror 201 comprises a plurality of metal islands separated by subwavelength, slit shaped openings. FIG. 4C illustrates the embodiment where the bandpass filter/partial mirror 201 comprises a metal film with a plurality of subwavelength apertures or openings. As shown in FIG. 4A, the metal islands or the metal film with apertures can be formed directly on the dielectric material located in the gap 203 of the F-P cavity filter 200. The dielectric material, such as silicon oxide, is located on the second partial mirror 202.

FIGS. 5A-5E shows various alternative configurations of the filters 100 or 200. For example, FIG. 5A shows the device in which both partial mirrors 101 and 102 contain an integrated plasmonic bandpass filter and in which the embossings 121 face in the same direction (in this case toward the incident radiation). In FIG. 5B, the embossings 121 face in opposite directions (in this case outward or away from the dielectric in gap). In FIG. 5C, both partial mirrors 201, 202 comprise an integrated plasmonic bandpass filter which comprises the metal islands or the metal film with apertures. In FIG. 5D, each partial mirror comprises a different type of plasmonic bandpass filter. For example, the lower partial mirror 102 comprises the embossing structure type integrated bandpass filter while the upper partial mirror 201 comprises the metal island or metal film with openings type of integrated bandpass filter. In FIG. 5E, partial mirror 101 comprises a metal film 120 containing both the embossing structures 121 and apertures 122 in the film 120 in the gap regions between the structures 121. Any combination of the above configurations may be utilized.

The continuously-tuned, variable-gap Fabry-Perot cavity structure can be easily implemented by tilting one of the two mirrors with proper angle and separation. This can be accomplished by forming a tapered spacer dielectric material in the cavity. The tapered spacer material is thicker on one end than the other end. For example, the spacer material 103 or 203 may have one "flat" or "horizontal" side and one "tilted" or "diagonal" side. In another example, both the "upper" and "lower" spacer sides may be "tilted" or "diagonal" such that the spacer material has a trapezoid-like shape rotated by 90 degrees. The directional terms above are provided in quotes because they are described with respect to the structure being positioned horizontally. However, it should be understood that the structure may be positioned vertically or in any other suitable orientation. Alternatively, the mirror tilting can be accomplished by raising one end of a mirror slightly higher than the opposite end of the same mirror in case the cavity lacks a spacer material. Any suitable materials may be used. For example, the mirror material for the partial mirror which lacks the integrated bandpass filter may comprise silver or multi-period $SiO_2/TiO_2$ mirrors. The spacer material may be glass ($SiO_2$) or air. Other optically transmissive materials may also be used. The Fabry-Perot cavity structure 100 or 200 thus has a wavelength tunability and a spatial and temporal (static and dynamic) passband width of about $\lambda/50$ or less, such $\lambda/100$ or less, such as about $\lambda/50$ to about $\lambda/100$.

Figure 6B:
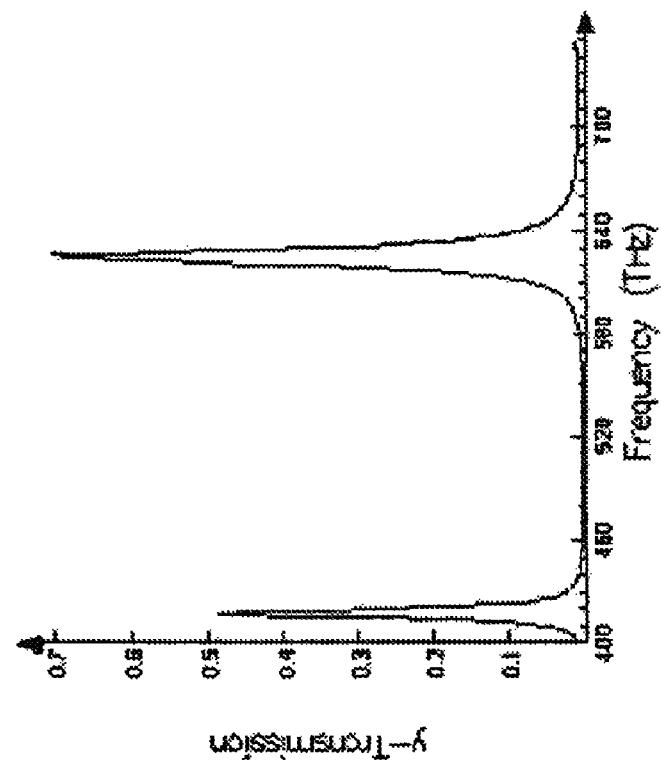
FIGS. 6B, 6D, 6F and 6H are graphical representations of computer simulations of transmission intensity as a function of wavelength for different array geometries 6A, 6C, 6E and 6G respectively.
Figure 6A:
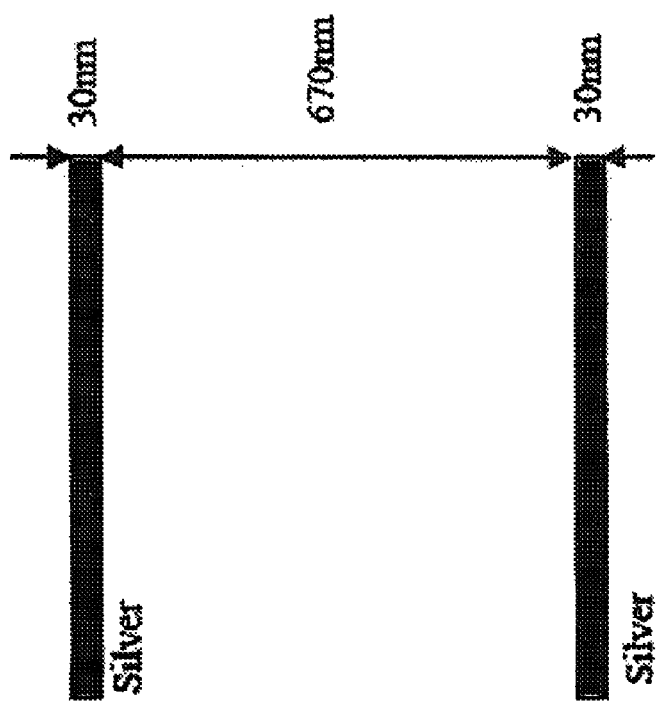
FIGS. 6A, 6C, 6E and 6G are graphical representations of examples of plasmonic Fabry-Perot filters.

FIGS. 6A and 6B represent a prior art F-P filter configuration. In FIG. 6B, the solid line represents transmission of light through a prior art Fabry-Perot filter of FIG. 6A, having first and second partial mirrors, each comprising a 30 nm thick Ag film. The mirrors are spaced apart by 670 nm from each other.

Figure 6D:
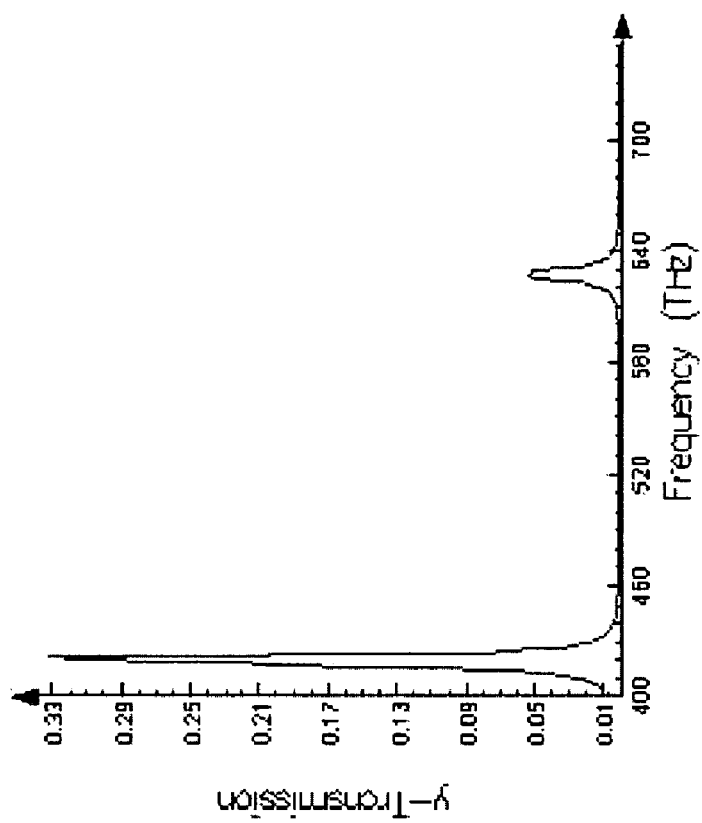
Figure 6C:
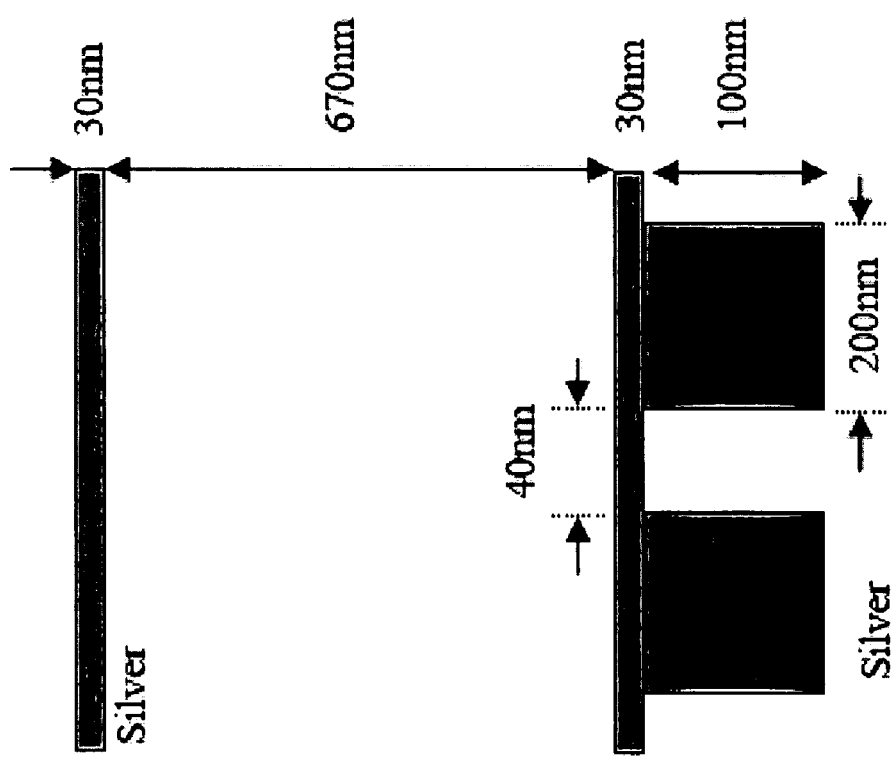

FIGS. 6C to 6G represent filter configurations according to embodiments of the invention. In FIG. 6D, the solid line represents transmission of light through a plasmonic Fabry-Perot filter of FIG. 6C, having a first partial mirror comprising a 30 nm thick Ag film and a second mirror made of plasmonic embossings on a film, wherein the film is a 30 nm thick Ag film and each embossing is 100 nm thick and 200 nm wide, and wherein the gap between the embossings is 40 nm. The mirrors are spaced apart by 670 nm from each other.

Figure 6E:
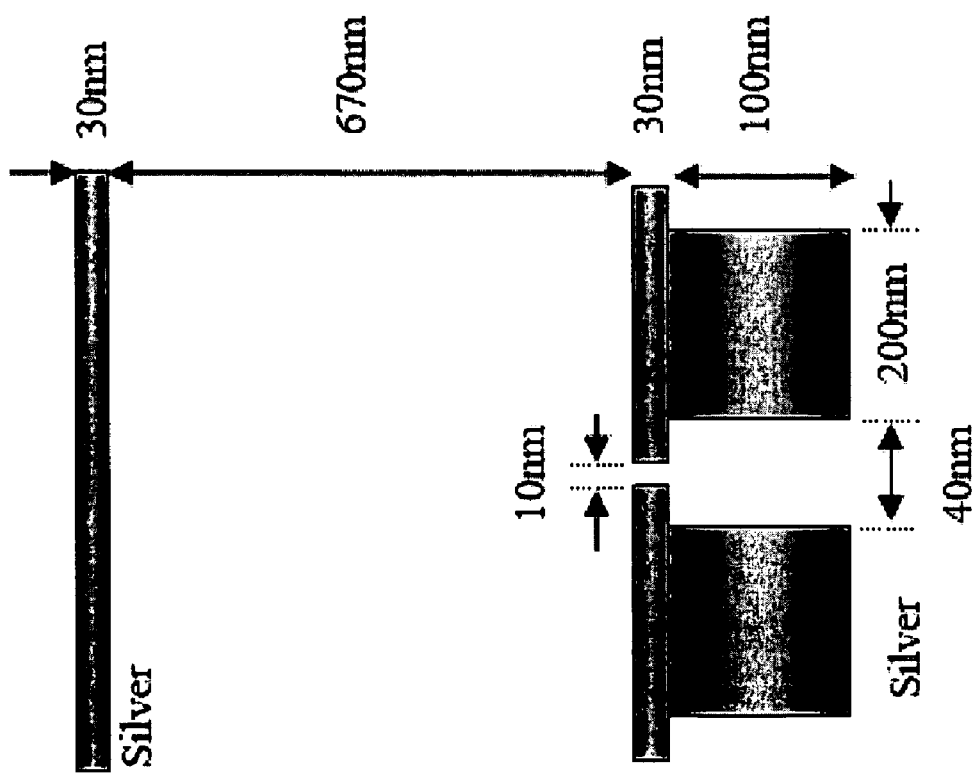
Figure 6F:
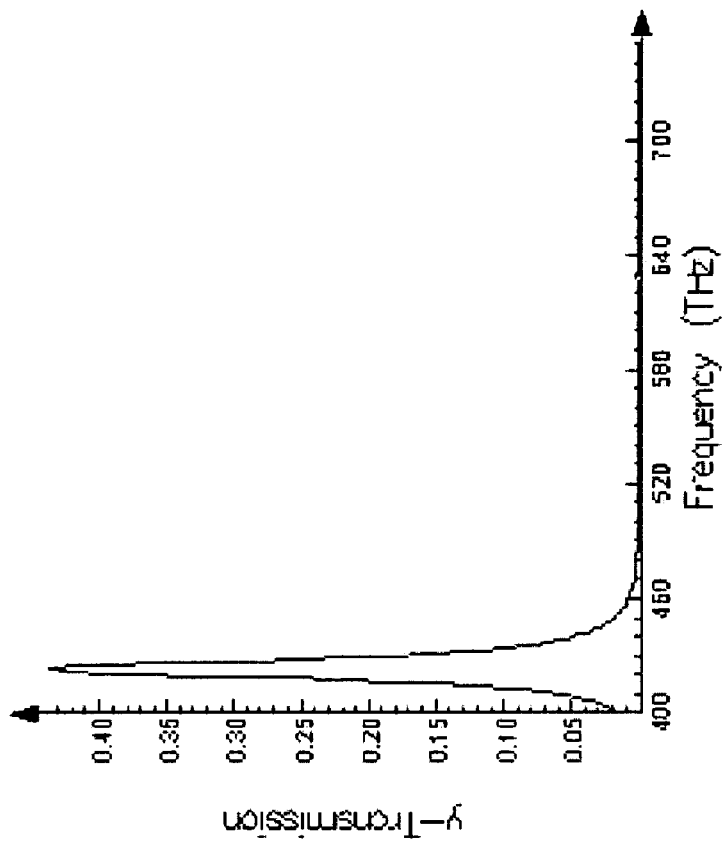

In FIG. 6F, the solid line represents transmission of light through a plasmonic Fabry-Perot filter of FIG. 6E, having a first partial mirror comprising a 30 nm thick Ag film and a second mirror of plasmonic embossings on a 30 nm Ag film, wherein each embossing is 100 nm thick and 200 nm wide and the gap between the embossings is 40 nm. Furthermore, a 10 nm wide aperture through the Ag film is located in each gap region between the embossings. The mirrors are spaced apart by 670 nm from each other.

Figure 6H:
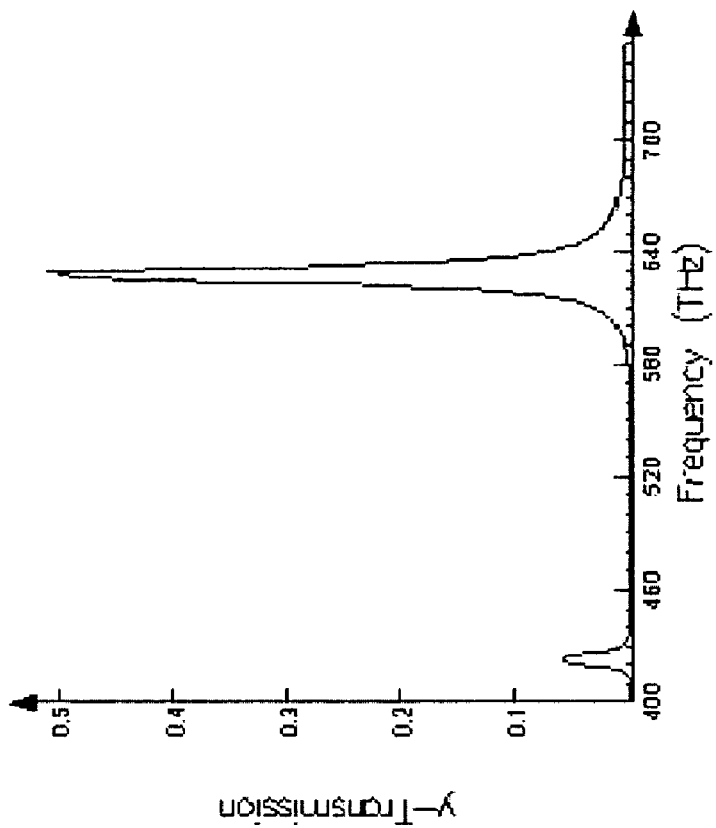
Figure 6G:
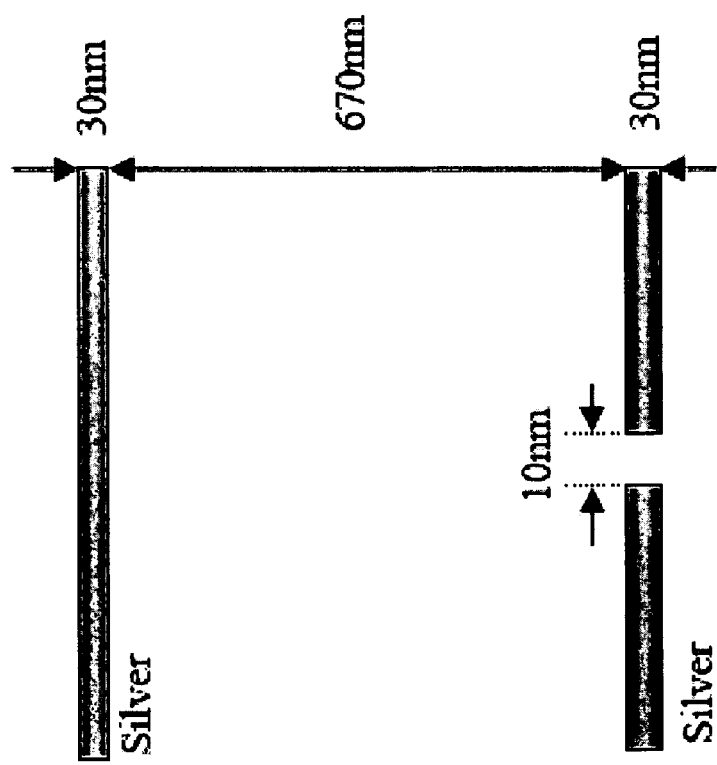

In FIG. 6H, the solid line represents transmission of light through a plasmonic Fabry-Perot filter of FIG. 6G, having a first partial mirror comprising a 30 nm thick Ag film and a second mirror comprising 10 nm wide plasmonic apertures in a 30 nm thick Ag film. The mirrors are spaced apart by 670 nm from each other.

Applications

The novel high resolution plasmonic Fabry-Perot filtering functions that have been revealed and demonstrated with subwavelength scale array of metallic embossing, array of apertures in a metal film or plurality of metal islands integrated bandpass filter are expected to bring a major impact on various fields that involves optics.

The filter 100, 200 can be used together with a photodetector 604 to form a spectrum analyzer or spectrometer, as shown in FIG. 7. Any device which can detect visible, UV and/or IR passband transmitted radiation may be used as the photodetector 604. The photodetector is adapted to detect radiation transmitted through the filter. Preferably, an array of solid state photodetector cells, such as a semiconductor photodetector array is used as a photodetector. Most preferably, charge coupled devices (CCDs), a CMOS active pixel sensor array or a focal plane array are used as the photodetector. The photodetector 604 shown in FIG. 7 includes a substrate, such as a semiconductor or other suitable substrate, and a plurality of photosensing pixels or cells 1, 2, and 3.

Figure 8:
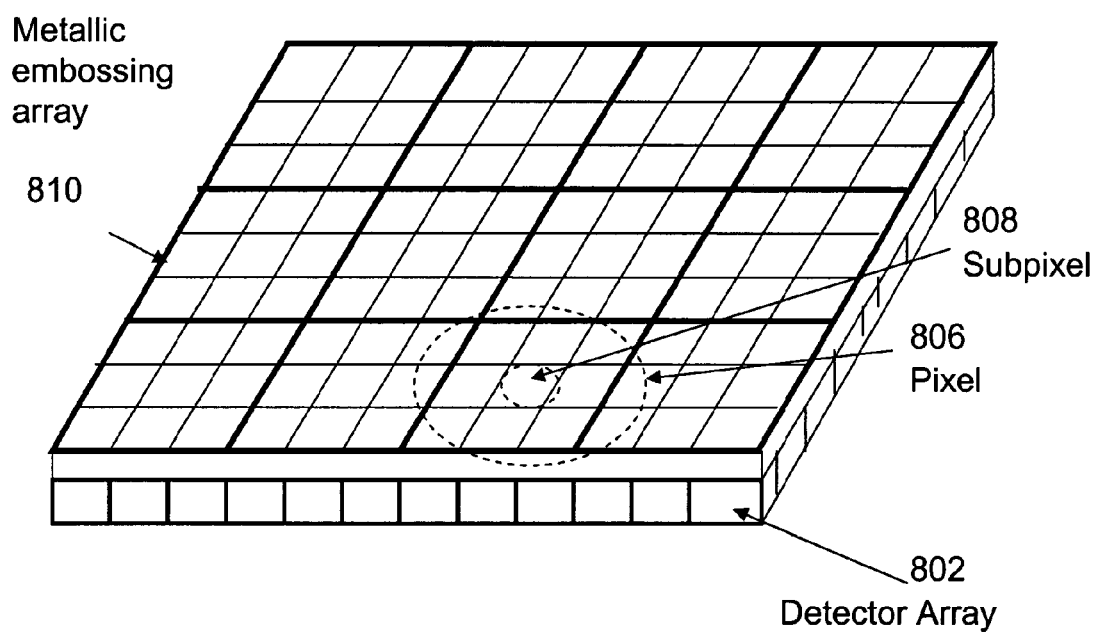
FIG. 8 is schematic representation of a multispectral imaging system.

FIG. 8 is schematic representation of a multispectral imaging system, when the monochromator is extended to a two dimensional array configurations. A multispectral imaging system is a system which can form an image made up of multiple colors. One example of a multispectral imaging system is a digital color camera which can capture moving and/or still color digital images of objects or surroundings. Another example of a multispectral imaging system is an infrared camera, which forms a digital image in visible colors of objects emitting infrared radiation, such as a night vision camera. The camera contains a processor, such as a computer, a special purpose microprocessor or a logic circuit which forms a color image (i.e., as data which can be converted to visually observable image or as an actual visually observable image) based on radiation detected by the photodetector. The multispectral imaging system may store the color image in digital form (i.e., as data on a computer readable medium, such as a computer memory or CD/DVD ROM), in digital display form (i.e., as a still or moving picture on a screen) and/or as a printout on a visually observable tangible medium, such as a color photograph on paper.

FIG. 8 shows the multispectral imaging system comprising a three dimensional wavelength separation device (i.e., the metallic embossing array) 810 and a photodetector 802. The system contains an array of cells or pixels 806 arranged in two dimensions. Preferably, the cells 806 are arranged in a rectangular or square matrix layout. However, any other layout may be used instead. Each cell 806 is adapted to produce a multicolor portion of a multidimensional image.

Each cell or pixel 806 comprises at least three subcells or subpixels 808 shown in FIG. 8, such as nine subpixels. Each subcell 808 in a particular cell 806 is designed to transmit one particular color (or a narrow IR, VIS or UV radiation band). Each cell 806 of the array 810 is preferably identical to the other cells in the array because each cell contains the same arrangement of subcells 808.

The array 810 can also be used in a liquid crystal display as a color filter for each pixel of the LCD. In this case, the array 810 is positioned over a back light which emits white light and the array filters particular light colors for each pixel.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

What is claimed is:

1. A plasmonic Fabry-Perot filter comprising:
a first partial mirror; and
a second partial mirror separated from the first partial mirror by a gap;
wherein at least one of the first partial mirror or the second partial mirror further comprises an integrated plasmonic optical filter array; and
wherein at least one of the first partial mirror or the second partial mirror is the plasmonic optical filter array.

2. A filter set forth in claim 1, wherein the plasmonic optical filter array comprises a plurality of metal islands, or multiple apertures in a metal film or a metal embossing array on a metal film.

3. A filter set forth in claim 2, wherein said plurality of metal islands, multiple apertures in metal film or metal embossing array on a metal film are configured such that the incident light is resonant with at least one plasmon mode on the structures in said metal film or metal islands; and the predetermined wavelength will perturb the metallic plasmonic structures in surface plasmon energy bands for the wavelength selective transmission of light.

4. A filter as set forth in claim 1, wherein the plasmonic optical filter array functions as a channel selection filter such that only one peak from a Fabry-Perot cavity etalon filter passes through the plasmonic Fabry-Perot filter.

5. A filter as set forth in claim 1, wherein the first partial mirror or the second partial mirror or both are located on an optically transparent substrate.

6. A filter as set forth in claim 1, wherein the gap between the first partial mirror and the second partial mirror comprises vacuum or is filled with an optically transparent dielectric material.

7. A filter as set forth in claim 1, wherein a height of the gap between the first partial mirror and the second partial mirror is remains constant or changes along a width of the filter.

8. A filter as set forth in claim 7, wherein the first mirror or both the first and the second mirrors are tilted with respect to an imaginary center line extending through the gap in the width direction of the filter.

9. A plasmonic Fabry-Perot filter comprising:
a first partial mirror; and
a second partial mirror separated from the first partial mirror by a gap;
wherein at least one of the first partial mirror or the second partial mirror further comprises an integrated plasmonic optical filter array; and
wherein at least one of the first partial mirror or the second partial mirror and the integrated plasmonic optical filter array comprise a common single piece of metal or a plurality of common metal islands.

10. The filter of claim 9, wherein at least one of the first partial mirror or the second partial mirror and the integrated plasmonic optical filter array consist essentially of a metal film containing embossing structures or apertures.

11. A method of making an integrated plasmonic Fabry-Perot filter, the method comprising:
providing a first partial mirror; and
forming a plurality of metal islands or a metal film with embossing structures or apertures over the first partial mirror, such that the metal islands or the metal film with embossing structures or apertures form a second partial mirror and an integrated plasmonic optical filter array.

12. The method of claim 11, wherein the second partial mirror and the integrated plasmonic optical filter array comprise the plurality of metal islands.

13. The method of claim 11, wherein the second partial mirror and the integrated plasmonic optical filter array comprise the metal film with the embossing structures.

14. The method of claim 11, wherein the second partial mirror and the integrated plasmonic optical filter array comprise the metal film with the apertures.

* * * * *